United States Patent [19]

Shimasaki

[11] 4,004,098
[45] Jan. 18, 1977

[54] SATELLITE ON-BOARD SWITCHING SYSTEM WITH SATELLITE-TO-SATELLITE LINK

[75] Inventor: Nobuhiko Shimasaki, Tokyo, Japan

[73] Assignee: Communications Satellite Corporation (Comsat), Washington, D.C.

[22] Filed: July 10, 1975

[21] Appl. No.: 594,881

Related U.S. Application Data

[63] Continuation of Ser. No. 422,219, Dec. 6, 1973, abandoned.

[52] U.S. Cl. .................................. 179/15 BS; 325/4
[51] Int. Cl.² ......................................... H04J 3/06
[58] Field of Search .................... 179/15 BS; 325/4; 178/69.5 R, 53

[56] References Cited

UNITED STATES PATENTS

3,757,334  9/1973  Raabe ..................................... 325/4
3,789,142  1/1974  Shimasaki ....................... 179/15 BS Primary Examiner—David L. Stewart
Attorney, Agent, or Firm—Alan J. Kasper; Jay H. Maioli

[57] ABSTRACT

A Space Division Multiple Access (SDMA) Communications satellite system which utilizes a pair of communications satellite relays having a communications link between them. Each satellite includes a plurality of receive spotbeam antennas which are selectively connected to a plurality of transmit spotbeam antennas by an on-board switching matrix under control of an on-board oscillator. Each spotbeam antenna communicates with a different geographical zone which includes one or more earth stations. Each station may communicate with all other stations in the system including those within the field of view of the spotbeam antennas aboard the other satellite. In order to maintain synchronization between the satellites, a designated reference station transmits a reference synchronization burst of four sequential unique words to the satellite within its field of view. The reference burst is related to the other satellite and back again to the first satellite where it is relayed back to the reference station. Relative phase drift of the satellites' respective oscillators is detected at the reference station as a failure to detect the first or fourth unique word. Improper propagation delay due to distance variation between the satellites is detected at the reference station as a failure to detect the second or third unique word during a predetermined time period. Oscillator drift is corrected by changing the frequency and/or phase of the oscillator in one of the satellites through telemetry control circuitry at a control facility which may be the reference station. Improper propagation delay is corrected by adding or subtracting delay in the satellite to satellite communications path by the use of variable delay pads aboard one of the satellites which are remotely controlled by telemetry signals from the control facility.

8 Claims, 13 Drawing Figures

SATELLITE ON-BOARD SWITCHING SYSTEM WITH SATELLITE-TO-SATELLITE LINK

This is a continuation, of application Ser. No. 422,219 filed Dec. 6, 1973, and now abandoned.

BACKGROUND OF THE INVENTION

1. Field of the Invention

This invention relates generally to relay-type communications satellites, and more particularly to a space division multiple access (SDMA) system which utilizes a pair of satellites having a communcation link between them and each satellite includes directional spotbeam antennae, and an on-board switching matrix.

2. Description of the Prior Art

Conventional space division multiple access (SDMA) communications satellite systems employ a single satellite which includes multiple transmit/receive directional spotbeam antennas. In prior art SDMA systems, several earth stations, each in a different geographical zone access different spotbeam antennas aboard a satellite. Typically, each such antenna communicates with a different geographical zone on the earth's surface. In one prior art system disclosed in U.S. Pat. No. 3,711,855 (entitled "Satellite On-Board Switching" issued to Schmidt et al. on Jan. 16, 1973 and assigned to the assignee of this invention) the satellite contains a switching matrix which interconnects antennas into pairs for specified intervals according to a pre-established sequence so that short bursts of digital information may flow from a transmitting earth station in view of one antenna to a receiving earth station in view of another antenna.

The period of time during which a complete sequence of bursts from all the stations in the system are received at the satellite is designated as the satellite time frame. Such prior art systems require that all participating earth stations be time synchronized with respect to the common satellite time frame so that their respective bursts are simultaneously received at the satellite. In addition, in order to properly distribute the received communications burst the switching matrix on-board the satellite must be precisely synchronized with the satellite time frame so that the proper communications path is established.

Several prior art systems exist for synchronizing SDMA communications satellite systems which utilize communication satellites that do not have a communications link between them. According to the method disclosed in the aforementioned U.S. Pat. No. 3,711,855, a synchronizing burst is transmitted from a designated reference earth station to a satellite relay where detection of the synchronizing burst is used to synchronize the satellite on-board switching matrix. The synchronizing burst is also retransmitted to all earth stations through the on-board switching matrix. In addition, each earth station transmits a characteristic unique word pattern. The unique word patterns are received at the satellite and retransmitted through the on-board switching matrix to the originating earth station. In order to maintain synchronization, each earth station adjusts its time of transmission so that its unique word pattern is received a predetermined time after receipt of the synchronization burst from the reference station.

Another prior art technique for synchronizing a single satellite (SDMA) communications systems is disclosed in U.S. patent application Ser. No. 128,396 (filed on Mar. 26, 1971 entitled "Frame Synchronization Technique for Satellite On-Board Switching Systems" by Shimasaki et al., and assigned to the assignee of the present invention). The synchronization technique disclosed therein is similar to the above-described technique of the Schmidt et al. patent except that instead of using a reference burst transmitted by a designated reference earth stations as the basis for synchronization, system synchronization is controlled by a master oscillator on-board the satellite. Each earth station as in the Schmidt et al. system transmits a characteristic unique word pattern. At the start of every communications frame the on-board master oscillator causes the on-board switching matrix to connect the respective input spotbeam antenna of each station to that station's output spotbeam antenna so that each earth station receives its own unique word pattern. The earth stations maintain synchronization by observing the retransmitted unique word pattern to see if a predetermined portion of the unique word pattern is properly received. If the predetermined portion of the unique word pattern is not properly received, the station will adjust its time of transmission until it is properly received.

The synchronization systems of these and other prior art communications satellite systems can not be used to maintain synchronization in a SDMA communications satellite system which uses two satellites with a communications link between them. This is because such systems in addition to requiring that synchronization be maintained between the on-board switching matrix of each satellite and that satellites associated earth stations, also require that synchronization be maintained between the satellites so that communication may flow from an earth station in view of one satellite through the switching matrices of both satellites to an earth station in view of the other satellite and vice versa.

In a two satellite communications system having a direct inter-satellite communication link in which each satellite includes an on-board master oscillator to maintain synchronization of its on-board switch and associated earth stations, synchronization error between the two satellites may result from relative drift of the satellites respective master oscillators or from improper propagation delay in the inter-satellite communication path due to distance variation between the satellites. Prior art synchronization systems fail to provide a technique for correcting this error.

SUMMARY OF THE INVENTION

It is an object of the invention to provide a SDMA communications satellite system containing two communications satellites having a communications link between them.

It is a further object of the invention to provide a technique for synchronizing a two-satellite SDMA communications system having a direct inter-satellite communication link.

It is a further object of the invention to provide a synchronization technique for two satellite SDMA communications system using a inter-satellite communication link which will compensate for relative drift of the respective satellite oscillators and for distance variation between the satellites.

In accordance with this invention, each satellite of a two-satellite communications system includes a plurality of receive spotbeam antennas which are selectively connected to a plurality of transmit spotbeam antennas by an on-board switching matrix according to a predefined sequence. Each satellite further includes an on-board master oscillator for generating synchronizing control signals, the frequency and phase of which may be varied in response to remote telemetry signals. Each spotbeam antenna communicates with a different geographical zone which includes one or more earth stations. Each station may communicate with all other stations in the system including those within the field of view of the spotbeam antennas aboard the other satellite.

Each satellite maintains synchronization between its associated earth stations and its on-board switching matrix through the use of its respective master oscillator in a manner identical to that described in the above referenced U.S. patent application Ser. No. 128,396. In order to maintain synchronization between the two satellites, a designated reference station transmits a reference synchronization burst of four sequential unique words to the satellite within its field of view. These four unique words are in addition to the two unique word pattern which is used in the system of U.S. patent application Ser. No. 128,396 to maintain synchronization between the earth stations and their respective satellites.

The four unique word burst is first transmitted from the designated reference station to a satellite (designated as satellite No. 1), within its view, then relayed to the other satellite (designated as satellite No. 2), then returned to satellite No. 1 and finally retransmitted to the originating reference station. This multiple transmission is called "looping" the synchronization burst. The looping of the four unique word burst makes it possible to detect and distinguish at the reference station, changes in the length of the communications path link between the satellites and relative drift of the respective satellite master oscillators.

Improper propagation delay due to distance variation between the satellites is detected at the reference station as a failure to detect during a predetermined time interval the second or third unique word. Improper propagation delay is corrected by adding or subtracting delay in the inter-satellite communications path by the use of variable delay pads aboard one of the satellites which are remotely controlled by telemetry signals from a control facility which may be the reference station.

Relative phase drift of the satellites respective oscillators is detected at the reference station as a failure to detect the first or fourth unique word. Oscillator drift is corrected by changing the frequency and/or phase of the oscillator of one of the satellites through telemetry control circuitry at the control facility.

DESCRIPTION OF THE PREFERRED EMBODIMENT

Figure 1:
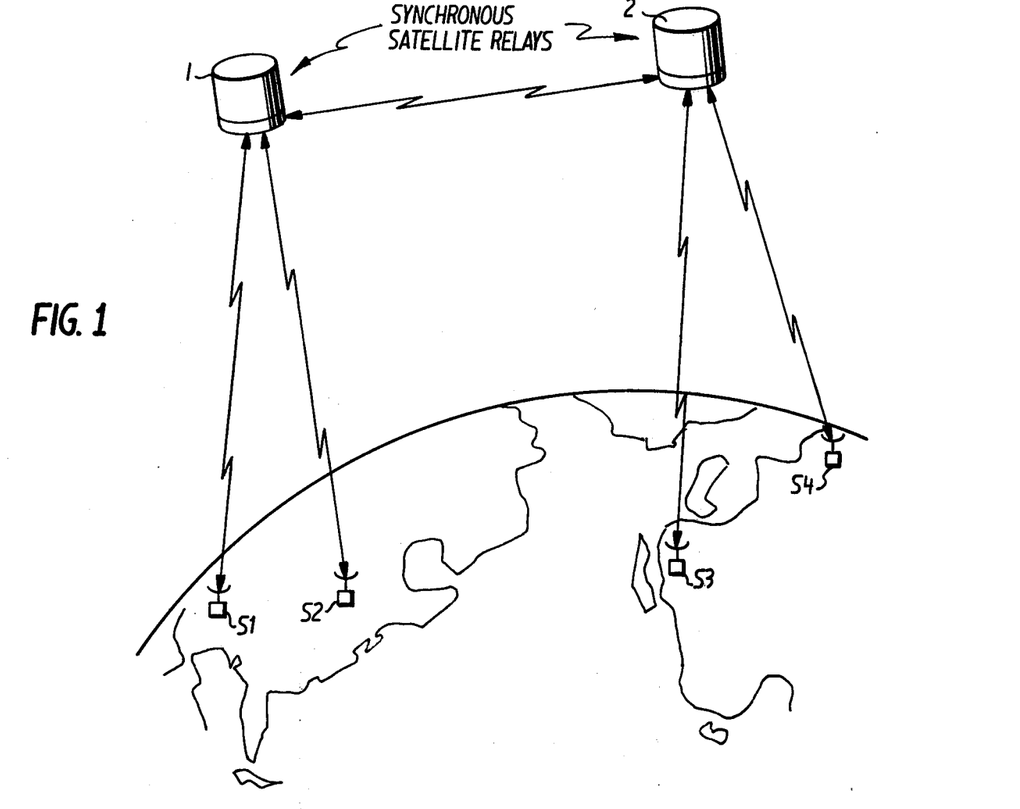
FIG. 1 is a schematic diagram illustrating the communications system of the present invention.

Referring to FIG. 1, a schematic diagram of a SDMA communications satellite system is shown including two communication satellites 1 and 2 respectively, each in a separate synchronous orbit. Each satellite includes directional spotbeam antennae pointed at respective earth stations S1, S2, S3, and S4. The spotbeam antennas aboard satellite 1 are pointed at earth stations S1 and S2 and the spotbeam antennas aboard satellite 2 are pointed at earth stations S3 and S4. Each satellite also includes directional spotbeam antennae pointed at the opposite satellite in order to establish a communications link between the satellites.

In order to simplify the discussion, each spotbeam antennae is shown as directed at a single earth station. However, several earth stations within the geographical zone defined by the field of view of a spotbeam antennae may sequentially access the same spotbeam antennae in a time divided manner. This mode of operation is generally referred to as Time Division Multiple Access (TDMA), and is more fully described in the above referenced U.S. patent application Ser. No. 128,396. The principles of the invention are fully applicable to SDMA systems which employ TDMA and to SDMA systems which do not use TDMA techniques.

Although four earth stations and associated spotbeam antennas have been illustrated, other numbers of earth stations and associated spotbeam antennae may be part of the system in accordance with the teachings of the invention.

Figure 2:
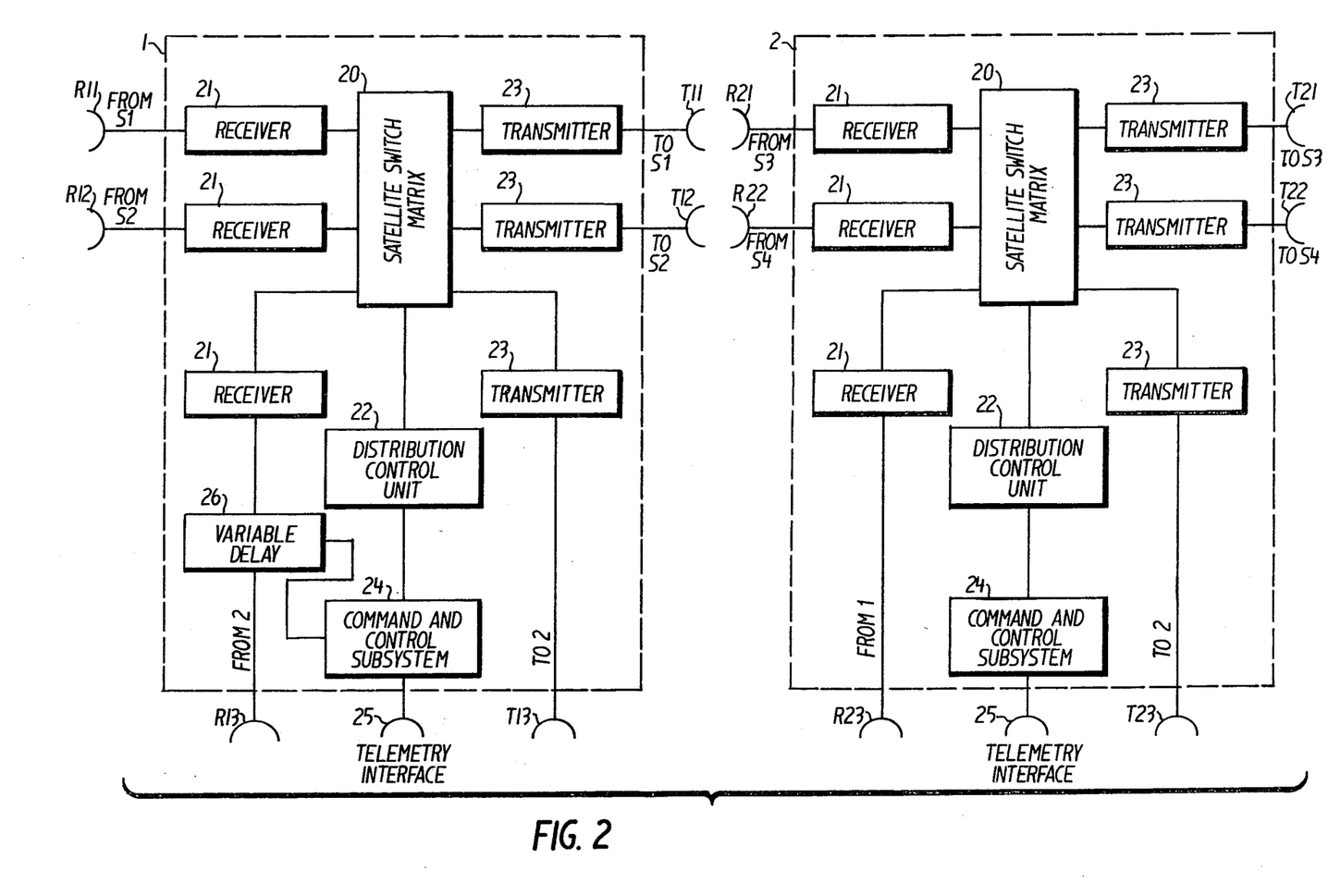
FIG. 2 is a schematic block diagram of the communication equipment on-board the satellites shown in FIG. 1.

Referring to FIG. 2, a schematic block diagram of the communication equipment on board the satellites 1 and 2 is shown. The communications equipment aboard the satellites 1 and 2 is identical. Each satellite contains a switching matrix 20 and associated control circuitry 22. The switching matrix 20 aboard satellite 1 is connected to receive signals from the receive spotbeam antennas R11, R12, and R13 aboard satellite 1. The switching matrix 20 aboard satellite 2 is connected to receive signals from the receive spotbeam antennas R21, R22, and R23 aboard satellite 2. The receive antennas R11, R12, R21 and R22 are each oriented to receive signals from a different earth station S1, S2, S3 and S4 respectively. The receive antenna R13 aboard satellite 1 is oriented to receive signals from satellite 2 and the receive antenna R23 aboard satellite 2 is oriented to receive signals from satellite 1.

The receive antennae for the respective satellites are each connected to identical communications receivers 21, well known in the art. Communication signals from the receivers 21 are input to the respective satellite switching matrices 20, where under control of the respective Distribution Control Units 22, they are connected to the appropriate transmitter 23, well known in the art. Each satellite further includes a command and control subsystem 24 which transmits and receives control information over a telemetry interface antenna 25. The command and control subsystem 24 is shown in greater detail in FIG. 9 and is further discussed hereinafter. Each of the transmitters 23 outputs signals to a separate transmit spotbeam antenna T11, T12, and T13 aboard satellite 1 and T21, T22 and T23 aboard satellite 2. The transmit spotbeam antennas T12, T13, T21 and T22 are each oriented to transmit signals to a different earth station S1, S2, S3 and S4 respectively. The transmit spotbeam antenna T13 aboard satellite 1 is oriented to transmit signals to satellite 2 and the transmit spotbeam antenna T23 aboard satellite 2 is oriented to transmit signals to satellite 1. A variable delay 26 under control of the command and control subsystem 24 is included in the intersatellite communication path (for example by placing it at the input of receiver 21 of satellite 1 as shown in FIG. 2) in order to compensate for distance variations between the satellites as will be more fully explained below.

Figure 3:
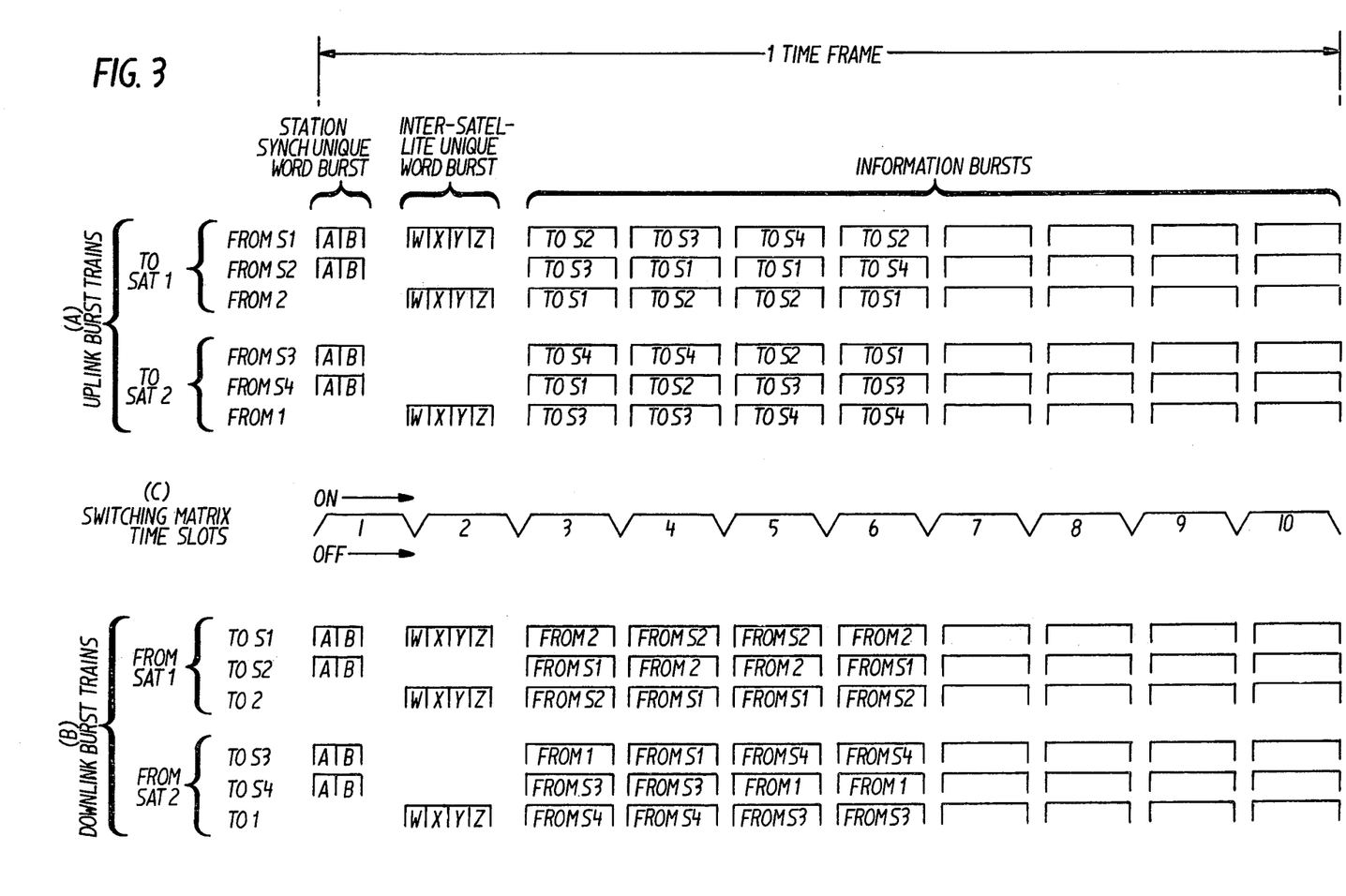
FIG. 3A illustrates the time relation and format of communication signals transmitted to the satellite relays from each other and from the stations shown in FIG. 1.
FIG. 3B illustrates the time relation and format of communication signals transmitted from the satellite relays to each other and to the stations shown in FIG. 1.
FIG. 3C, in conjunction with FIGS. 3A and 3B, illustrate the time relation between the satellite switching matrix time slots and the communication signals transmitted to and from the satellites shown in FIG. 1.
Figure 4A:
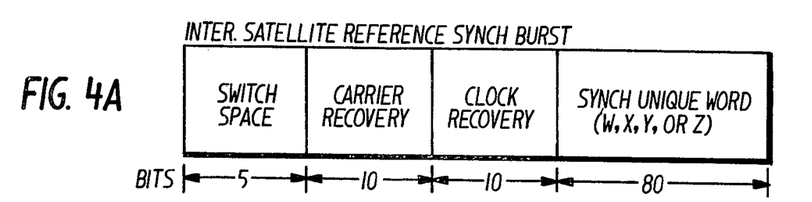
FIG. 4A illustrates the format of the intersatellite synchronization unique word burst shown in FIG. 3.
Figure 4B:
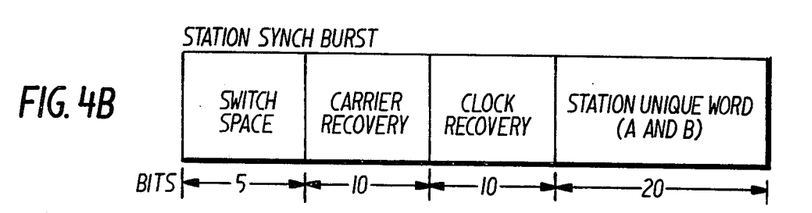
FIG. 4B illustrates the format of the station synchronization unique word burst shown in FIG. 3.
Figure 4C:
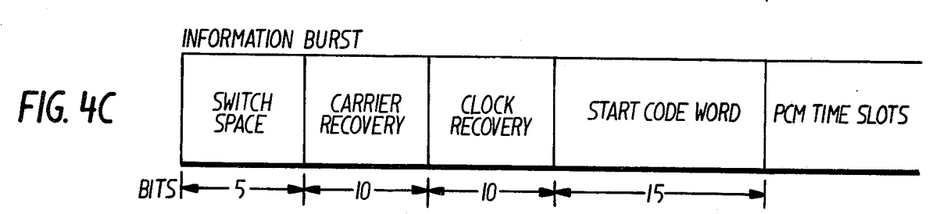
FIG. 4C illustrates the format of the information burst shown in FIG. 3.

Referring to FIGS. 3 and 4 therein is shown the format and time relation of the communication bursts transmitted to the satellites (up-link burst trains) and the format and time relation of the communication bursts transmitted from the satellites (down-link burst trains). In explaining the format of the time frame it is assumed that the station S1 is acting as a reference station for transmission and reception of inter-satellite synchronization signals. It being realized that any station may assume the reference station function.

FIG. 3A shows the up-link format which results in the downlink format of FIG. 3B. In the example shown, both the up-link and downlink burst trains are divided into ten separate switching periods each frame of equal duration, which are designated as time slots. Each time slot may include one or more separate burst transmissions. A change in time slot (which is illustrated in FIG. 3C as a transition between the on and off positions of the graph) corresponds to a change in the connections made by each of the respective satellite switching matrices. Also illustrated in FIG. 3C is the time relation of the time slots to the uplink and downlink burst trains. Each of the 10 separate satellite switching matrix interconnections made during a frame is synchronized with the time of reception and transmission of one or more bursts from the respective satellites.

Each burst train in FIG. 3A represents a transmission to one of the satellites. The bursts from stations S1 and S2 and satellite 2 are transmitted to satellite 1. The bursts from stations S3 and S4 and satellite 1 are transmitted to satellite 2. The first time slot in the frame is reserved for transmission of the station synchronization unique word. The second time slot in the frame is reserved for transmission of inter-satellite synchonization signals. The format of the satellite time frame is the same for all stations in the other eight time slots and comprise eight information time slots.

Each burst train in FIG. 3C represents a transmission from one of the satellites. The burst train of FIG. 3C directly result from the received transmissions of FIG. 3A. The bursts to stations S1 and S2 and satellite 2 are transmitted from satellite 1. The bursts to stations S3 and S4 and satellite 1 are transmitted from satellite 2. The frame format of the down-link burst trains is identical to the frame format of the up-link burst trains and comprises the station synchronization time slot followed by the intersatellite synchronization time slot, followed by eight information time slots.

The station synchronization unique word bursts are transmitted between each station and its associated satellite only. The station synchronization unique word bursts are not transmitted between the satellites. The inter-satellite synchronization unique word burst transmitted during the inter-satellite synchronization time slot is transmitted by the reference station S1 only and relayed by the two satellites as will be more fully described below. During those time slots in which the stations or satellites are not transmitting bursts an unmodulated carrier is transmitted.

There are three types of bursts transmitted in the system, a station synchronization unique word burst, an inter-satellite synchronization unique word burst, and an information burst. In the first time slot of both the up-link and down-link burst trains the station unique word burst is transmitted. In the second time slot of both burst trains inter-satellite unique word burst is transmitted. One information burst is transmitted in each of the remaining eight time slots of both burst trains. Specifically shown in FIGS. 3A and 3B is the destination of the information bursts in the first four information time slots. However, in a like manner the other 4 time slots may also be used for transmitting information to the other earth stations in the system.

In the operation of the system, each station transmits a continuous carrier signal, the modulation of which is PCM/TDM/CPSK/TDM. In other words, communication channel inputs at the stations are pulse-code-modulation (PCM) encoded and time-division-multiplexed (TDM) into a single multichannel bit stream which enters a coherent phase shift keyed (CPSK) modulator to modulate an IF signal. Because these PSK modulated signals are, in addition, transmitted in short bursts which are time-grouped by destination and have a definite time period, this super modulation may be described as TDM as well.

The format of the bursts which comprise the satellite time frame is shown in FIGS. 4A, 4B, and 4C. The first three positions for all bursts are identical and include the following: a five bit switch space, followed by a ten bit carrier recovery space, followed by a 10 bit clock recovery space. The switch space is utilized to compensate for ambiguities in the frame synchronization subsystem by alloting a few bits at the beginning of each burst so that switching transients do not include essential portions of the bursts. Since all bursts are, in general, relatively incoherent with respect to each other in carrier and clock signals, space is also provided at the beginning of each burst to allow for carrier and clock recovery.

The remaining bits of the inter-satellite synchronization unique word burst illustrated in FIG. 4A are devoted to the four 20 bit codes for the inter-satellite synchronization unique word which is illustrated symbolically as W, X, Y, and Z. The remaining bits of the station synchronization unique word burst illustrated in FIG. 4B comprise the two 20-bit codes for the station synchronization unique word which is illustrated symbolically as A and B. The remaining bits of the information bursts illustrated in FIG. 4C comprises a 15 bit start code word followed by the PCM encoded TDM communication channels. The start code word is a unique series of 15 bits which is used to indicate the position of the beginning of the voice channel information and to identify the terrestrial destination of the information bursts.

When frame synchronization has been achieved (as more fully described below) the first bit of each burst train in FIG. 3A is received simultaneously at the indicated satellite. On-board each satellite, the switching system will properly direct the synchronization and information bursts destined for a particular earth station to the satellite output spotbeam associated with that particular station according to a predefined sequence. This is shown in FIG. 3B. Thus, all information bursts that were destined for station S1, for example, in the transmit format shown in FIG. 3A are now grouped together in FIG. 3B in the row labeled To S1.

Each station maintains the proper frame synchronization with its respective satellite by transmitting a station synchronization unique word in the up-link data stream once each frame at a predetermined time. The predetermined time is chosen for each station so that the unique words from all stations will be simultaneously received at their respective satellite relays during the station unique word time slot. The respective switching matrix on-board each satellite, at the beginning of the station synchronization time slot, connects the receive spotbeam antenna of each station with its associated transmit spotbeam antenna, thereby providing a path wherein the particular earth station may receive its own station synchronization unique word. The path, is of course, made for all stations in the system simultaneously. Each station includes detection equipment which detects that station's unique word pattern in the downlink burst train.

Proper positioning of the station synchronization unique word in the station synchronization unique word time slot at the satellite will insure that the information bursts will be properly distributed for transmission to the destined earth stations. As will hereinafter be more fully discussed the in-synchronism condition will depend on the degree of coincidence at the satellite between the station synchronization unique word and the station synchronization unique word time slot. It is to be noted that the station synchronization unique word AB shown in FIG. 3A need not actually be AB for each station it is necessary only that each station's synchronization unique word have the same characteristics so as to insure proper synchronization.

FIGS. 3A and 3C show the situations when the time frames from the earth stations are in proper time alignment with the on-board switching matrix. Thus, for example, having transmitted the station synchronization unique word AB and having properly received the station synchronization unique word AB, the earth station will then know that its transmission will be in proper frame synchronization with the on-board switching matrix. In a like manner if each station in the system transmits a station synchronization unique word AB and, receives the station synchronization word AB, then every station in the system will be transmitting its information bursts in frame synchronization with the switching matrix on-board its respective satellite. Should one station, after transmitting its station synchronization unique word burst, receive only part of the synchronization unique word burst, for example only A, then it will know that its transmission is not in proper frame synchronization. Accordingly, it will know that its transmission is occurring too late in time with respect to the respective on-board switching matrix and with respect to the other stations in the system and it will therefore know to advance its transmission in time to accomplish frame synchronization.

Figure 5:
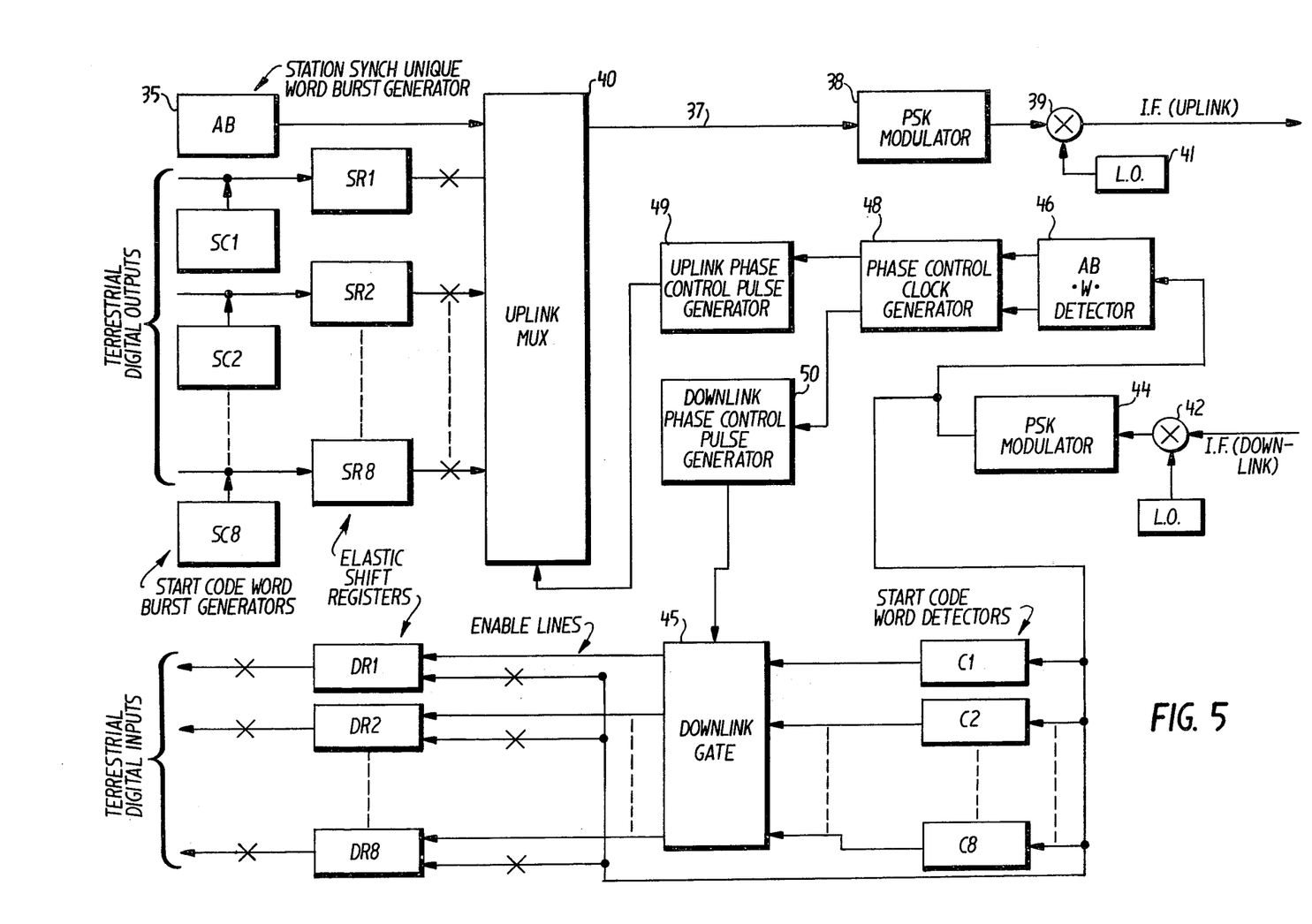
FIG. 5 is a schematic block diagram of the station communication equipment.

Referring to FIG. 5 therein is shown a portion of the earth station equipment. Each earth station includes a station synchronization unique word burst generator 35 well-known to one skilled in the art for generating the station synchronization unique words A and B. The burst output of this generator is time division multiplexed with the eight information bursts from elastic shift registers SR1–SR8 by up-link multiplexer 40 of a type well known to one skilled in the art. The initial portion of each information burst contains a start code word generated by start code word generators SC1–SC8 well known to one skilled in the art.

The complete sequence of multiplexed information transmitted by each station constitutes the time frame as shown in FIG. 3A with the exception of the intersatellite synchronization unique word burst (W, X, Y, and Z) which is transmitted by the reference station only. The frame of information is fed via line 37 to a PSK (phase shift key) modulator 38 for modulation of a carrier as is well known in the art. After modulation the signal is mixed in mixer 39 with the frequency from local oscillator 41 and the generated IF is transmitted through the IF up-link to the respective satellite. The transmitted frame is then distributed by the respective on-board switching matrices of the satellites as already discussed, to first return the station synchronization unique word information to the transmitting station followed by the information bursts destined for it from the other stations in the system.

At the receiver the incoming bursts are mixed in mixer 42 with the frequency from local oscillator 43. along with the distributed information bursts in order to recover the carrier which is demodulated in PSK demodulator 44. After demodulation in PSK demodulator 44, the start code word received at the beginning of each information burst is detected by one of the start code word detectors C1–C8, well known in the art. One of the start code word detectors then sends a pulse to the down-link gate 45 which in turn gates the information bursts to the proper terrestrial digital input through 8 elastic shift registers DR1–DR8 in accordance with the terrestrial source designated by the code word.

The station synchronization unique words which have been received are detected in the station synchronization unique word detector 46. If the station synchronization unique word is properly detected for example, the full word AB is detected, then, having transmitted and received AB the transmitting earth station will know it is in frame synchronization with its respective satellite and no further control is needed. However, if the station synchronization unique word is not properly received, for example, the detected word is A only or B only, then the station synchronization unique word detector 46 will emit a phase control signal which is then fed to phase controlled clock generator 48 of a type well known in the art. The clock generator 48 will then emit a pulse to a phase control pulse generator 49, well known in the art which will in turn emit a pulse to uplink multiplexer 40 which will gate the outgoing transmitting information by either advancing the time of transmission should the detected part of the station synchronization unique word be A or by delaying the transmitted bursts should the detected part of the station synchronization would be B. A pulse is also emitted from the phase control clock generation 48 to down link phase control pulse generator 50 which in turn emits a control pulse to downlink gate 45 to alter the time of transmission of the incoming information burst to coincide with the phase of the outgoing bursts. This operation will occur until the received station synchronization unique word detected in the station synchronization word detector 46 is the full word AB, thereby indicating to the transmitting station that it is in frame synchronization with the on-board switching matrix for its respective satellite.

Figure 6:
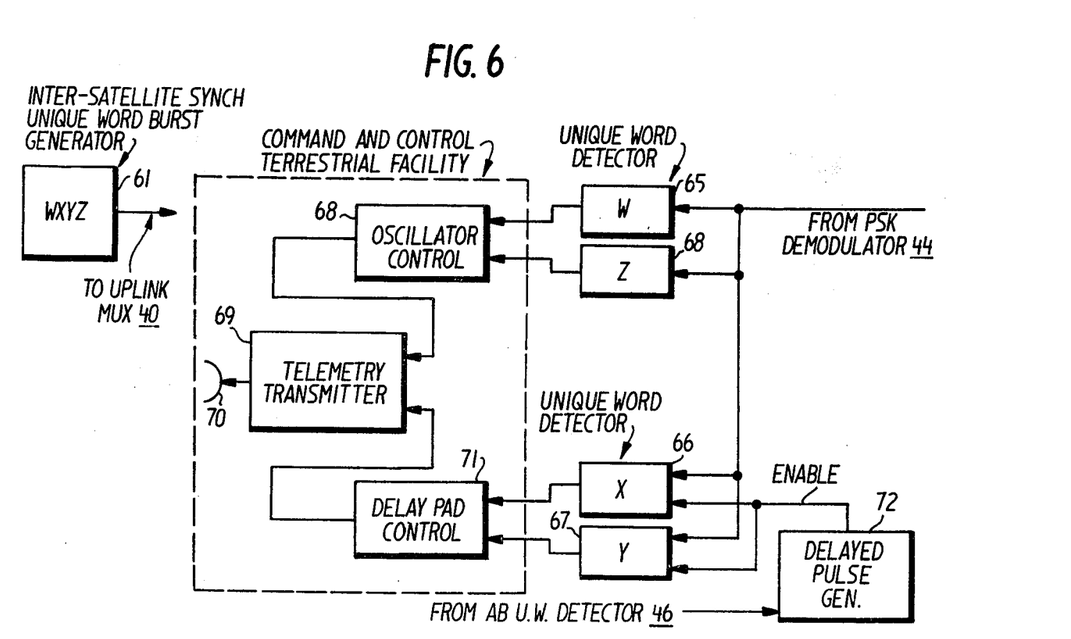
FIG. 6 is a schematic block diagram of additional station communication equipment contained in the reference station.

Referring to FIG. 6, there is shown additional equipment in the reference station required to maintain synchronization in the inter-satellite communication link. The reference station includes all the equipment shown in FIG. 5 and in addition on the transmit side, an inter-satellite synchronization unique word burst generator 61, is provided to generate the inter-satellite synchronization unique words W, X, Y and Z respectively. The inter-satellite unique word burst is time division multiplexed along with the station synchronization unique word burst and the information bursts by multiplexer 40. The complete sequence of multiplexed information transmitted by the reference station S1 is shown in FIG. 3A.

On the receive side in addition to the equipment shown in FIG. 5 the reference station includes four intersatellite synchronization unique word detectors, well known in the art, which detect the four inter-satellite synchronization unique word patterns W, X, Y, and Z respectively. If the W or Z unique word pattern is now properly detected, for example, the W word is not detected, the detector 65 will emit an oscillator control signal to the oscillator control circuitry 68 of the terrestrial command and control subsystem well known in the art, causing a telemetry signal to be transmitted from telemetry transmitter 69 through antenna 70 to the on-board oscillators of one of the satellites, for example, satellite 1, to cause its oscillator to advance in phase. Similarly if the W unique word pattern is properly detected by unique word detector 65 and the Z word is not properly detected, detector 99 will emit a control signal to oscillator control 68 to be transmitted by the terrestrial command and control subsystem to cause the on-board oscillators of one of the satellites to retard in phase. It can then be seen that the oscillator control unit 68 need not be complex, since it is only required to produce a signal indicating which of the unique word detectors, W or Z, has not detected the correct word.

The inter-satellite synchronization unique word detectors 66 and 67 used for monitoring distance variations between the satellites are under control of a delayed pulse generator 72, well known in the art, which in response to a pulse input, after a predetermined time delay, outputs a pulse of a predetermined duration. Delayed pulse generator 72 is used to generate an aperture to control the time during which unique word detectors 66 and 67 are enabled to detect the inter-satellite synchronization unique words X and Y respectively. The aperture is set to start a predetermined time after the reference station has properly detected its station synchronization unique word A and B and its duration is set approximately equal to the length of the X and Y unique words. In order to control the start time of the aperture the output from the AB unique word detector 46 of the reference station is input to delayed pulse generator 72. Proper reception of both the A and B unique words causes detector 46 to emit a pulse to delayed pulse generator 72, which after a predetermined delay emits a pulse to enable detectors 66 and 67 during the expected time of reception of the X and Y unique words.

If the X or Y unique word pattern is not properly detected, for example, the X word is not detected, detector 66 will emit a control signal to the on-board delay pad control circuitry 71 of the terrestrial command and control subsystem, well known in the art, causing a telemetry signal to be transmitted by telemetry transmitter 69 to the command and control subsystem aboard one of the satellites, for example satellite 1, which is used to control the delay aboard satellite 1, to shorten the propogation delay in the inter-satellite communication path. The delay pad control circuitry 71 need only be complex enough to produce an output signal indicating at which input terminal a signal is present. Input signals will be present only when one of the unique word detectors 66 or 67, fails to detect the correct word. Similarly if the Y unique word pattern is not detected detector 67 will emit a control signal to the delay pad control 71 causing a telemetry signal to be transmitted by telemetry transmitter 69 to the variable delay pads 26 aboard satellite 1, to increase the propagation delay in the inter-satellite communication path. The correction will be repeated each frame until the X and Y words are properly received.

Figure 7:
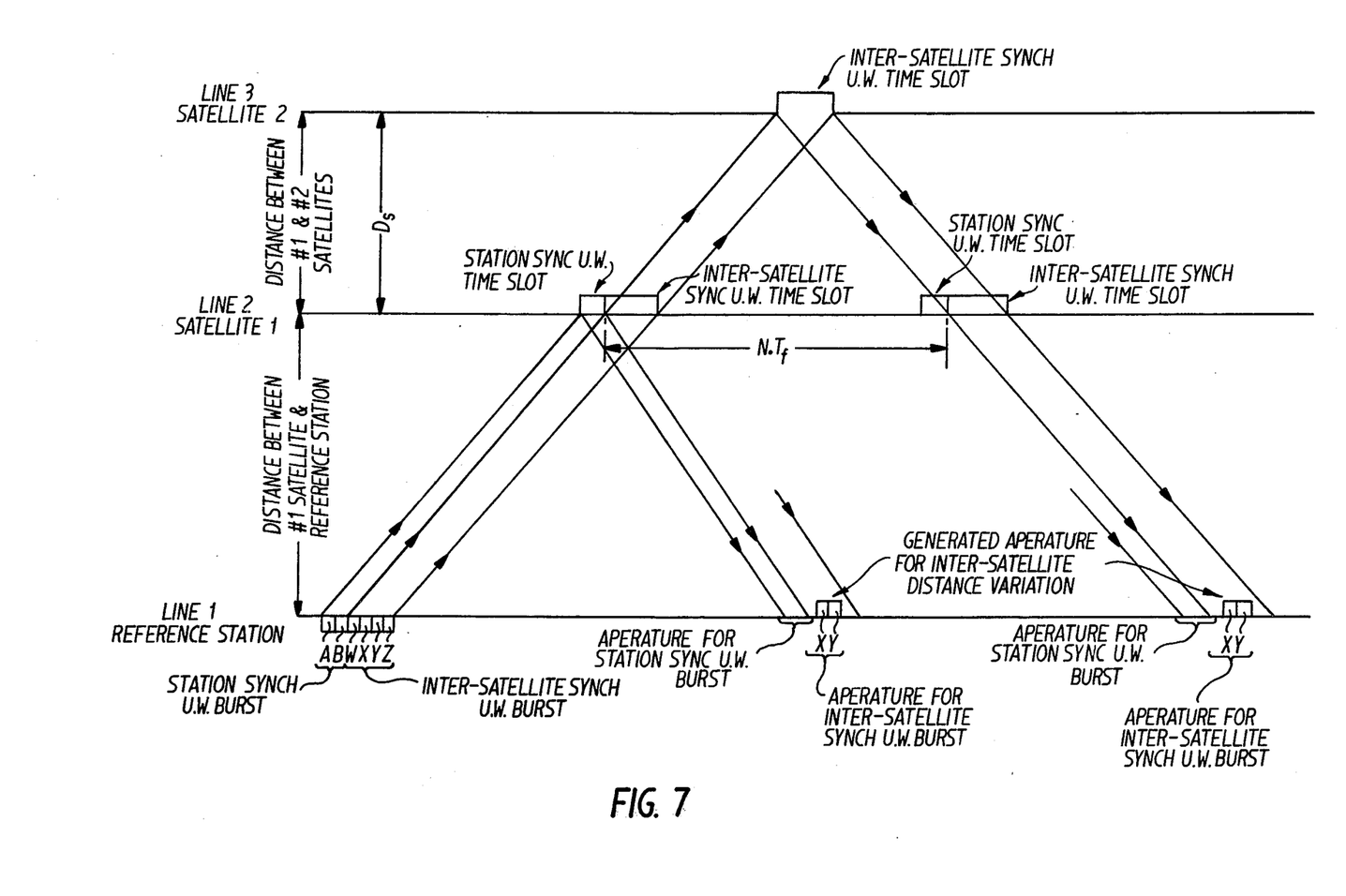
FIG. 7 is a graphical illustration of the time relation between the inter-satellite synchronization unique words, the station synchronization unique words and the switching matrix time slots.

FIG. 7 illustrates the time relation between the inter-satellite synchronization unique words, the station synchronization unique words and the switching matrix time slots. The figure shows the in-synchronization condition of the system. The lines 1, 2, and 3 of FIG. 7 represent the reference station, satellite 1 and satellite 2, respectively. The station synchronization unique word bursts A and B are transmitted by the reference station, received at satellite 1 during the station synchronization time slot and relayed back to the reference station where they are properly detected. The inter-satellite synchronization unique word burst W, X, Y and Z is transmitted by the reference station, received at the satellite 1 during the inter-satellite synchronization time slot and relayed to satellite 2. Since the distance between satellites 1 and 2 is an integral number of frame lengths (illustrated as N $T_f$) and the respective satellite master oscillators are synchronized, the inter-satellite synchronization unique words W, X, Y and Z are received at satellite 2 during the inter-satellite synchronization unique word time slot of the switching matrix of satellite 2 and relayed back to satellite 1 where they are again properly received during the inter-satellite synchronization time slot of the switching matrix of satellite 1. The four unique word bursts are then retransmitted to the reference station where they are again properly received.

Improper reception of the four inter-satellite unique words at the reference station may be caused by relative drift of the master oscillators of the respective satellites, which causes the inter-satellite synchronization time slot of the two satellites not to occur simultaneously and/or distance variation between the satellites such that the propagation delay in the inter-satellite communication path is not an integer multiple of the frame length. At the reference station the incoming burst train is examined continuously for the W and Z unique words, a loss of which indicates relative drift of the satellite oscillators. However, the X and Y unique words may be detected only during the generated aperture period of the reference station as previously described. The failure to detect either the X or Y unique word during the aperture period indicates that the distance between the satellites is not an integer multiple of the frame length.

Figure 8:
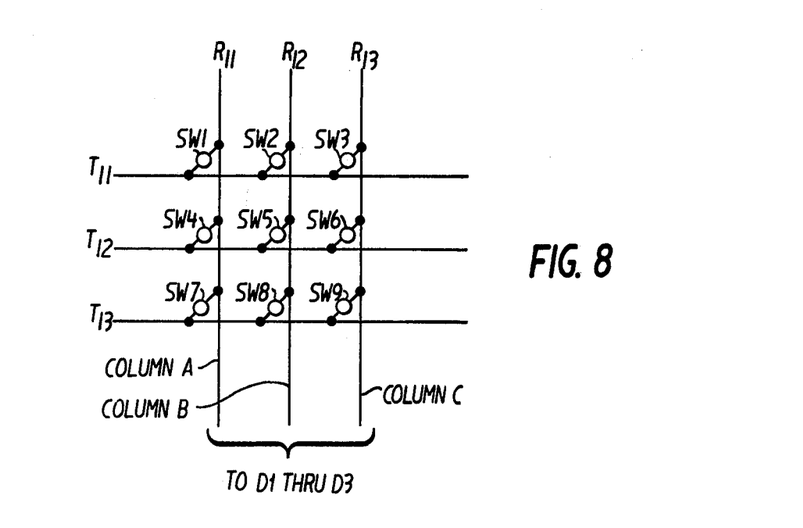
FIG. 8 is a schematic diagram of the satellite switching matrix.

One of the satellite switching matrices 20 onboard the respective satellites is illustrated in FIG. 8 and consists of a 3 × 3 array of microwave switches SW1–SW9 with their associated drivers. The switching matrices 20 for both satellites are identical and therefore only the switching matrix 20 of satellite 1 has been illustrated. It being realized that the discussion of this matrix also applies to switching matrix 20 aboard satellite 2 with respect to its associated earth stations. The switching matrix 20 aboard satellite 1 provides the desired cross connection between the 3 input spotbeam antennas R11, R12, R13 and the three output spotbeam antennas T11, T12, T13. Thus, a total of 9 possible cross-connection may be made. The sequence and duration of connection of the inputs and outputs of the satellite switching matrix 20 is programmable by the distribution control unit 22.

Each of the three columns of the matrix 20 aboard satellite 1 is connected to a different one of the three receive spotbeam antennas R11, R12 and R13 respectively such that all microwave switches in the same column of matrix 20 have one input connected to the same input spotbeam antenna through its respective receiver 21. Each of the three rows of the matrix 20 aboard satellite 1 is connected to a different one of the three transmit spotbeam antennas T11, T12 and T13 respectively such that all microwave switches in the same row of matrix 20 have their output connected to the same transmit spotbeam antenna through its respective transmitter 23.

Figure 9:
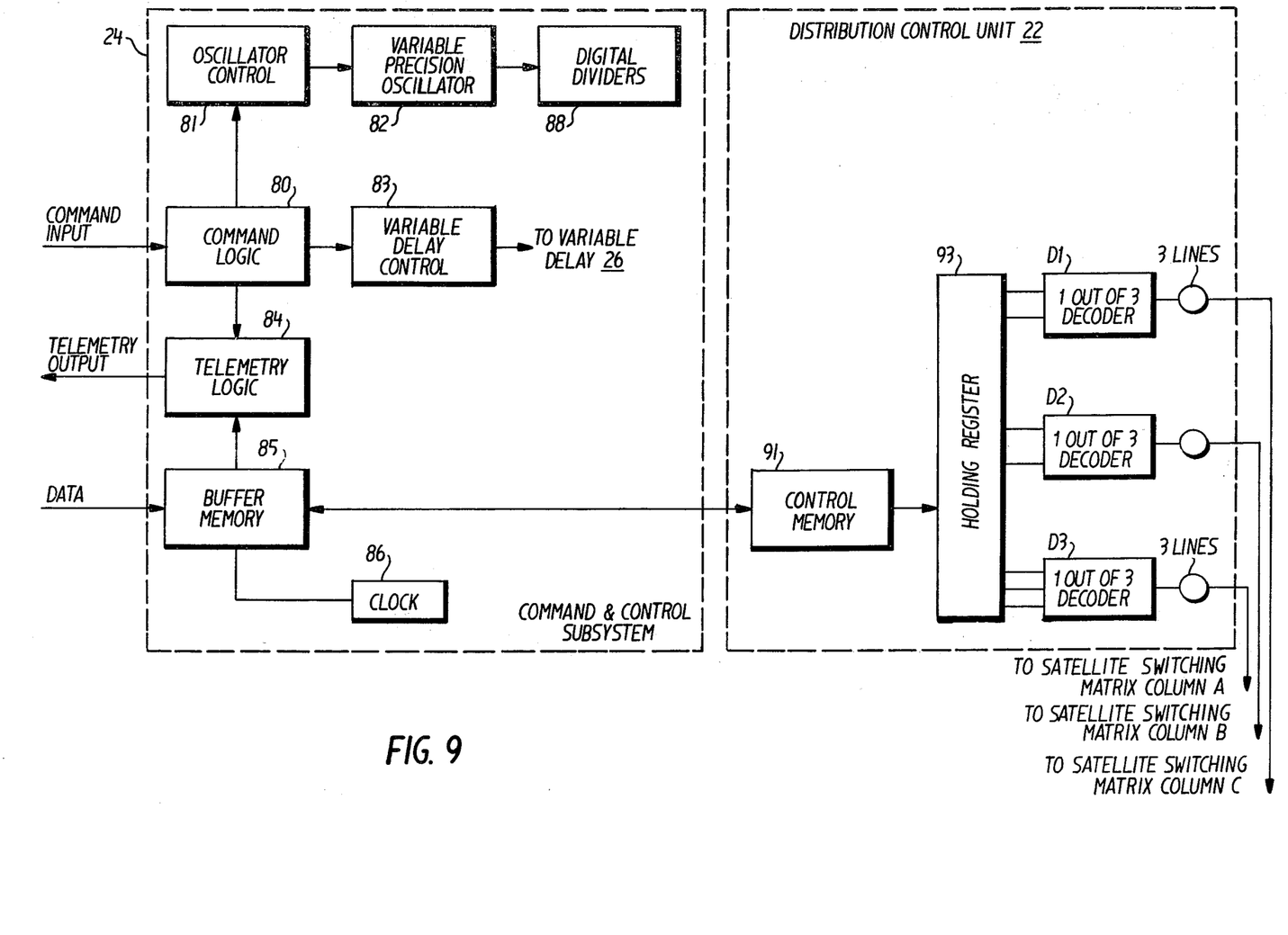
FIG. 9 is a schematic block diagram of the Distribution Control Unit and Command and Control subsystem shown in FIG. 2.

Referring to FIG. 9 therein is shown the details of the distribution control unit 22 aboard satellite 1. The distribution Control Unit 22 aboard satellite 2 is of course identical to that aboard satellite 1 and therefore only the distribution Control Unit aboard satellite 1 has been illustrated. It being realized that the discussion of this unit also applies to the identical unit aboard satellite 2. Data on traffic flow, used by the distribution control unit to allocate time slots between the 9 possible cross-connections of satellite switching matrix 20, is stored in a control memory 91. The data is stored as ten 6 bit digital words. This data may be altered to adapt to changes in traffic flow patterns in response to command inputs from ground control received by the command and control subsystem 24. The replacement data is read into Buffer memory 85, verified and transferred to control memory 91.

The control memory 91 stores the output connection to be made for each of the 3 inputs to the satellite switching matrix for each of the 10 time slots in a frame. At the start of every frame, data is output from the control memory 91 to a holding register 93, at the rate of one 6 bit word every time slot. The data word in the holding register 93 is then parallel accessed in three groups of 2 bits each by three 1 out of 3 decoders D1 through D3. There is a 1 out of 3 decoder corresponding to each of the three inputs to the satellite switching matrix 20. Thus D1, D2 and D3 correspond to R11, R12 and R13 respectively.

The output of each 1 out of 3 decoder is applied to the satellite switching matrix 20 and determines which of the three outputs of the satellite switching matrix will be connected to the input corresponding to that decoder.

At the start of the first time slot of each frame, control memory 91 will transfer the six bit code of 011011 to holding register 93. This will cause decoder D1 to decode a 1, D2 to decode a 2 and D3 to decode a 3 and in response thereto close switches SW1, SW3 and SW9 respectively in order that the receive spotbeam antennas in view of a particular station is connected to the transmit spotbeam antenna in view of that same station. This causes each station to receive its transmitted station unique word as described above.

At the start of the second time slot of each frame, control memory 91 will transfer the six bit code of 11XX01 (where X indicates an bit position that is not utilized) to holding register 93. This will cause decoder D1 to decode a 3 and in response thereto to energize switch SW7 at the junction of R11 and T13; and decoder D3 to decode a 0 and in response thereto to energize switch SW3 at the junction of R13 and T11, so that the inter-satellite synchronization unique words transmitted by the reference station are relayed to satellite 2 and the inter-satellite synchronization unique words relayed from satellite 2 are retransmitted to the reference station as described above.

Thereafter control memory 91 will transfer a new six bit code word to holding register 93 at the start of each of the remaining eight time slots in the frame to cause the interconnections to be made between the receive spotbeam antennas and the transmit spotbeam antennas indicated by the code word. For example, assume that at the start of the third time slot the code word 110110 is transferred to holding register 93. This will cause decoder D1 to energize switch SW7, decoder D2 to energize switch SW2 and decoder D3 to energize switch SW6. The simultaneous closing of the three switches SW7, SW2 and SW6 will route incoming information from station S4 via satellite 2 on antenna R13 to station S1 via antenna T11; from station S1 on antenna R11 to station S2 via antenna T12 and from station S2 on antenna R12 to station S4 via satellite 2 through antenna T13 respectivly as illustrated in time slot 3 of FIG. 3A. At the beginning of the next time slot, a new code word will be transferred to holding register 93 for example 101101 to cause switches SW4, SW8 and SW3 to be simultaneously closed to route information as shown in time slot 4 of FIG. 3A. At the start of a new time slot a new control word will be read into holding register 93 and the process repeated. In system operation the control memory 91 will output ten 6-bit data words, one every time slot, and the entire set of ten code words is repeated during each succeeding frame.

Referring further to FIG. 9, there is shown a block diagram of the command and control subsystem 24 aboard satellite 1. Telemetry logic 84 provides for terrestrial monitoring of the contents of control memory 91. Upon receipt of a command from ground control, command logic 80 signals control memory 91 to transfer its current contents to buffer memory 85 from which it is serially transmitted via a separate radio frequency link (now shown) to ground control under control of telemetry logic 84 and clock 86.

A variable high-stability crystal oscillator 82 in conjunction with digital dividers 88 provides a central timing reference for the communications system. This clock provides the synchronizing signals for the terrestrial stations and controls the timing of the satellite switching matrix 20. Variable delay control 83 well known in the art provides the control for the on-board time delay pads 26. Upon receipt of a command from ground control, command logic 80 signals variable delay control 83 to increase or decrease the delay of delay pad 26 to increase or decrease the propagation delay in the inter-satellite communication path in order to compensate for distance variations between the satellites as described above.

Oscillator control 81 well known in the art provides the control for the variable oscillator 82. Upon receipt of a command from ground control command logic 80 signals oscillator control 81 to advance or retard the frequency and phase of precision oscillator 82 in order to compensate for relative drift of the respective oscillators aboard satellite 1 and 2 as described above.

What is claimed is:

1. A space division multiple access communications satellite system comprising:
   a. a first satellite and a second satellite each satellite having on-board switching matrix means under control of a precision oscillator for selectively interconnecting a plurality of communications receivers each receiving incoming signals from a separate spotbeam antenna each in view of a separate geographical zone according to a predefined sequence;
   b. means for establishing a communications link between said satellites;
   c. a reference station including means for transmitting a burst of four unique words to said first satellite; and
   d. means for relaying the unique word burst from said first satellite over said communications link to said second satellite, back to said first satellite and back to said reference station.

2. A communications satellite system as claimed in claim 1 wherein said reference station further includes;
   a. a first detection means for detecting the first and fourth unique words in said unique word burst; and
   b. means responsive to said first detecting means for producing oscillator control signals for use by said first satellite when said first and fourth unique words are not properly detected.

3. A communications satellite system as claimed in claim 2 wherein the precision oscillator aboard said first satellite may be adjusted in frequency and phase in response to said oscillator control signals in order to compensate for relative drift between the precision oscillator aboard said first satellite and the precision oscillator aboard said second satellite.

4. A communications satellite system as claimed in claim 3 wherein said first satellite includes adjustable delay pads in said communcations link the delay of which may be increased or decreased in response to control signals from the ground to said first satellite in order to vary the propagation delay in said communications link.

5. A communications satellite system as claimed in claim 4 wherein said reference station further includes;
   a. second detecting means for detecting the second and third unique words of said unique word burst during a predetermined time interval; and
   b. means responsive to said second detecting means for producing delay pad control signals for use by said first satellite when said second and third unique words are not properly detected.

6. A communcations satellite system as claimed in claim 5 further comprising:
   a. means in said reference station for transmitting a two unique word burst to said first satellite;
   b. means on-board said first satellite for causing said two unique word burst to be retransmitted to said reference station;
   c. means in said reference station for detecting said two unique word burst;
   d. means in said reference station responsive to said last named detecting means for synchronizing the transmission of said reference station with the switching matrix on-board said first satellite; and
   e. wherein said predetermined time interval begins a predetermined time after said two unique word burst has been properly detected at said reference station.

7. A communications satellite system as claimed in claim 1 wherein each geographical zone includes a plurality of earth stations located therein and time division multiple access means for causing the earth stations within that geographical zone to sequentially access the spotbeam antenna in view of that geographical zone in a time divided manner.

8. In a space division multiple access communications satellite system employing a first and second satellite each having an on-board switching matrix means under control of a precision oscillator and each satellite having separate spotbeam antennae in view of separate geographic zones and each satellite being communicatively link one to another and to a terrestrial reference station, a method of detecting a state of synchronization between said switching matrices comprising the steps of
   a. transmitting to said first satellite from said reference station a burst of four unique words;
   b. relaying the unique word burst from said first satellite to said second satellite, back to said first satellite and back to said reference station;
   c. detecting at said reference a preselected pair of unique words in the unique word burst;
   d. transmitting control signals to said oscillator upon failure to properly detect said preselected unique word pair; and
   e. adjusting said oscillator in accordance with said control signals.

* * * * *